United States Patent [19]
Nakajima et al.

[11] 4,037,209
[45] July 19, 1977

[54] DATA PROCESSING SYSTEM FOR CONVERTING FROM LOGICAL ADDRESSES TO PHYSICAL ADDRESSES

[75] Inventors: Ichiro Nakajima; Isao Sanaka; Tsuginori Takeda, all of Kawasaki; Hiroyuki Koarai, Sagamihara; Toru Ando, Kawasaki; Tetsuhiko Ifuku, Yokohama; Hatsuo Murano, Kawasaki, all of Japan

[73] Assignee: Fujitsu Ltd., Kawasaki, Japan

[21] Appl. No.: 634,844

[22] Filed: Nov. 24, 1975

[30] Foreign Application Priority Data

Nov. 30, 1974 Japan .................. 49-138067

[51] Int. Cl.² .................................. G06F 7/04
[52] U.S. Cl. ..................................... 364/200
[58] Field of Search .................. 340/172.5; 445/1

[56] References Cited

U.S. PATENT DOCUMENTS

| | | | |
|---|---|---|---|
| 3,412,382 | 11/1968 | Couleur et al. | 340/172.5 |
| 3,693,165 | 9/1972 | Reilley et al. | 340/172.5 |
| 3,902,164 | 8/1975 | Kelley et al. | 340/172.5 |

Primary Examiner—Harvey E. Springborn
Attorney, Agent, or Firm—Daniel Jay Tick

[57] ABSTRACT

An address converter for converting logical addresses of a program to physical addresses of a memory device comprises a first address converter having entries corresponding to the logical addresses of the program on a 1 : 1 basis. The first address converter stores physical addresses corresponding to the logical addresses. Each entry of the first address converter has data indicating whether or not the memory area of the memory device corresponding to physical addresses stored in such entry is commonly used for applications. A second address converter has unique entries, each commonly selected by any of the logical addresses corresponding to each memory area of the memory device commonly used. The second address converter stores physical addresses corresponding to the memory areas of the memory device commonly used. The entry of the second address converter is indexed by a physical address stored in an entry of the first address converter, which entry of the first address converter includes data indicating that the corresponding memory area is commonly used.

2 Claims, 3 Drawing Figures

DATA PROCESSING SYSTEM FOR CONVERTING FROM LOGICAL ADDRESSES TO PHYSICAL ADDRESSES

BACKGROUND OF THE INVENTION

The present invention relates to a data processing system for converting from logical addresses to physical addresses.

The invention relates to a data processing system utilizing a page address system and is intended to smoothen the processing of the address conversion from a logical address to a physical address when a memory area is commonly used for several application purposes, program or job. More particularly, the system of the invention simplifies the processing when changing the physical address of a page commonly used.

In general, the memory of the data processing system is designed for improved cost performance by utilizing the hierarchical structure of the main memory unit at high speed, but small capacity, and an auxiliary memory unit at low speed, but large capacity. In such case, various types of data are transferred from the auxiliary memory unit, and stored, as required, in a specific physical address in the main memory unit. In other words, correspondence of several logical addresses is necessary.

Thus, the memory areas are classified into blocks, each of which is known as a page, for every predetermined size, for example, one thousand words. The pages are utilized to prepare a correspondence table or page map, of the physical address of the main memory unit and the logical address of the program. Furthermore, an address conversion for converting the logical address to the physical address is prepared, and access to the main memory unit is specifically provided after the address conversion. This method is called the page address system.

In the page address system, the program, even if it is described on continuous pages of the logical addresses, may be used by storing it on the non-continuous and desired pages of the physical addresses. It is thus possible to extract the necessary pages from the auxiliary memory unit and transfer them to idle pages at desired physical addresses of the main memory unit. The memory capacity viewed from the program may be expanded, irrespective of the capacity of the main memory unit, only by making the capacity of the auxiliary memory unit large.

On the other hand, when a data processing system is commonly used by several processing programs or jobs, it is conceived that the basic control program be commonly used by each processing program. In such case, since the space of logical addresses is independent in each program, a page map must be prepared for each processing program. In the aforedescribed memory unit with a hierarchical structure, the pages which are considered to be used for a while are left, but the old pages are ruled out. Newly required pages are then transferred from the auxiliary memory unit to the areas of the old pages.

The probability of usage is judged on the basis of an experience rule. The rule is that there is a high probability of continuous use of data of the continuous addresses. That is, there is a high probability of continuous use of newly transferred pages, but a low probability of use of the old pages. In such a judging method, when a page which has once been extracted is again transferred to the main memory unit for meeting the necessity, it is not always returned to the initial position. Therefore, the physical address of the page map area, or entries, concerning the relevant page must be rewritten.

When considering here the pages commonly used by several programs, as hereinbefore mentioned, it is necessary, in order to change the physical addresses, to rewrite all the several page map areas corresponding to the physical address. The more the number of programs commonly used, the more important this problem, and the longer and longer the time taken for rewriting of the map area.

The principal object of the invention is to provide a data processing system which smoothly processes the address conversion from a logical address to a physical address.

An object of the invention is to provide a data processing system which provides a simplified process for changing the physical address of a page commonly used.

Another object of the invention is to provide a data processing system of simple structure, which is inexpensive in manufacture.

Still another object of the invention is to provide a data processing system which operates rapidly, using a small number of components, for converting addresses from logical to physical.

Yet another object of the invention is to provide a data processing system which functions efficiently, effectively, reliably, rapidly and economically.

BRIEF SUMMARY OF THE INVENTION

In the data processing system of the invention, in order to complete the rewriting of the physical addresses of pages used in common only once, a page table is prepared separately from the address conversion by a page map. An associative register is included, if required. An area on the page table is indexed, if desired, by the different logical addresses, for the pages used in common. Furthermore, address conversion is performed by a first address conversion device utilizing the page map, for pages not used in common. Address conversion is performed by a second address conversion device utilizing the page table, for the pages used in common.

In accordance with the invention, a data processing system having an address converter for converting logical addresses of a program to physical addresses of a memory device, the memory device having a plurality of memory areas, the address converter being commonly utilizable for a plurality of applications with desired corresponding logical addresses and capable of providing access to the memory device in accordance with physical addresses obtained by the address converter, comprises a first address converter having entries corresponding to the logical addresses of the program on a 1:1 basis. The first address converter stores physical addresses corresponding to the logical addresses. Each entry of the first address converter has data indicating whether or not the memory area of the memory device corresponding to physical addresses stored in said entry is commonly used for applications. A second address converter has unique entries, each commonly selected by any of the logical addresses corresponding to each memory area of the memory device commonly used. The second address converter stores physical addresses corresponding to the memory areas of the memory device commonly used.

An entry of the second address converter is indexed by a physical address stored in an entry of the first address converter, which entry of the first address converter includes data indicating that the corresponding memory area is commonly used.

Each entry of the first and second address converters is stored in the memory device. An associative register is provided in addition to the first and second address converters, and comprises a plurality of registers each storing the logical addresses and the corresponding physical addresses whereby when the associative register fails to provide a desired physical address reference is initially made to the first address converter and when the first address converter has an entry having data indicating whether or not the memory area of the memory device corresponding to physical addresses stored in the entry is commonly used for applications, reference is initially made to the second address converter. A plurality comparator circuit is connected to the registers of the associative register for comparing the logical address of the program with the logical address stored in each of the registers. The physical address of the corresponding one of the registers is used as the read address when the comparator circuit indicates coincidence of the logical address of the one of the registers and the logical address of the program. Address conversion is undertaken by the first address converter when the comparator circuit indicates non-coincidence of the logical address of the one of the registers and the logical address of the program.

BRIEF DESCRIPTION OF THE DRAWINGS

In order that the invention may be readily carried into effect, it will now be described with reference to the accompanying drawings, wherein.

In the FIGS., the same components are identified by the same reference numerals.

DETAILED DESCRIPTION OF THE INVENTION

Figure 1:
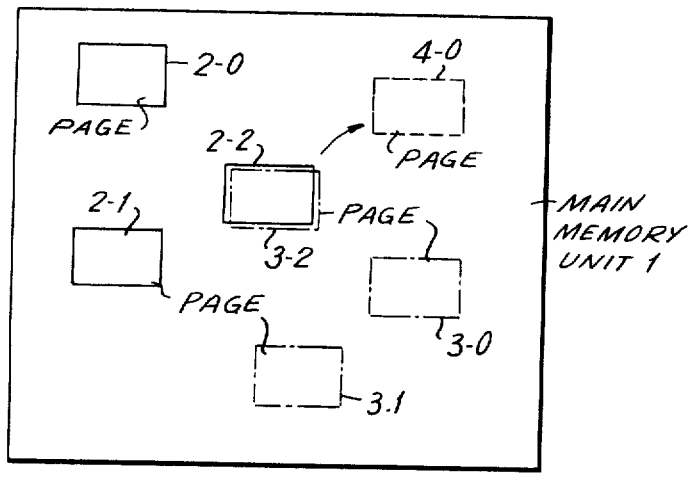
FIG. 1 is a schematic diagram showing the assignment of pages in the main memory unit and explaining the page table of the data processing system of the invention.

In FIG. 1, the main memory unit 1 has pages 2—0, 2—1 and 2—2, respectively, which are used for processing an A progress and pages 3—0, 3—1 and 3—2, respectively, which are used for processing a B program. A page 4—0 indicates the physical address to which the page 2—2 or 3—2 is transferred.

In the data processing system of the invention utilizing a page address system, the memory contents of the main memory unit are separated into pages. It is not determined, for example, at which physical address of the main memory unit the pages 2—0, 2—1 and 2—2 to be used for processing of the A program shall be stored. In other words, correspondence between the logical address and the physical address is managed by the page map hereinafter described with reference to FIG. 2. Therefore, the contents of the page map are altered when the physical address is altered. Furthermore, on the basis of the logical address from the arithmetic operator, etc., the physical address is obtained by indexing the page map. Access is thereby provided to the main memory by means of the physical address.

The page map also determines in which physical address of the main memory unit 1 the pages 3—0, 3—1 and 3—2 to be used for the processing of the B program may be found. In such case, it is a matter of occurrence that the page 2—2 used for the A program is in common with the page 3—2 used for the B program. It is also probable that the page 2—2 or 3—2 transfers to another physical address, such as page 4—0 shown in FIG. 1, when it is once extracted from the main memory unit and returned again to the initial position. In such case, the contents of the page map concerning page 2—2 for the A program and those concerning page 3—2 for the B program have to be altered.

Figure 2:
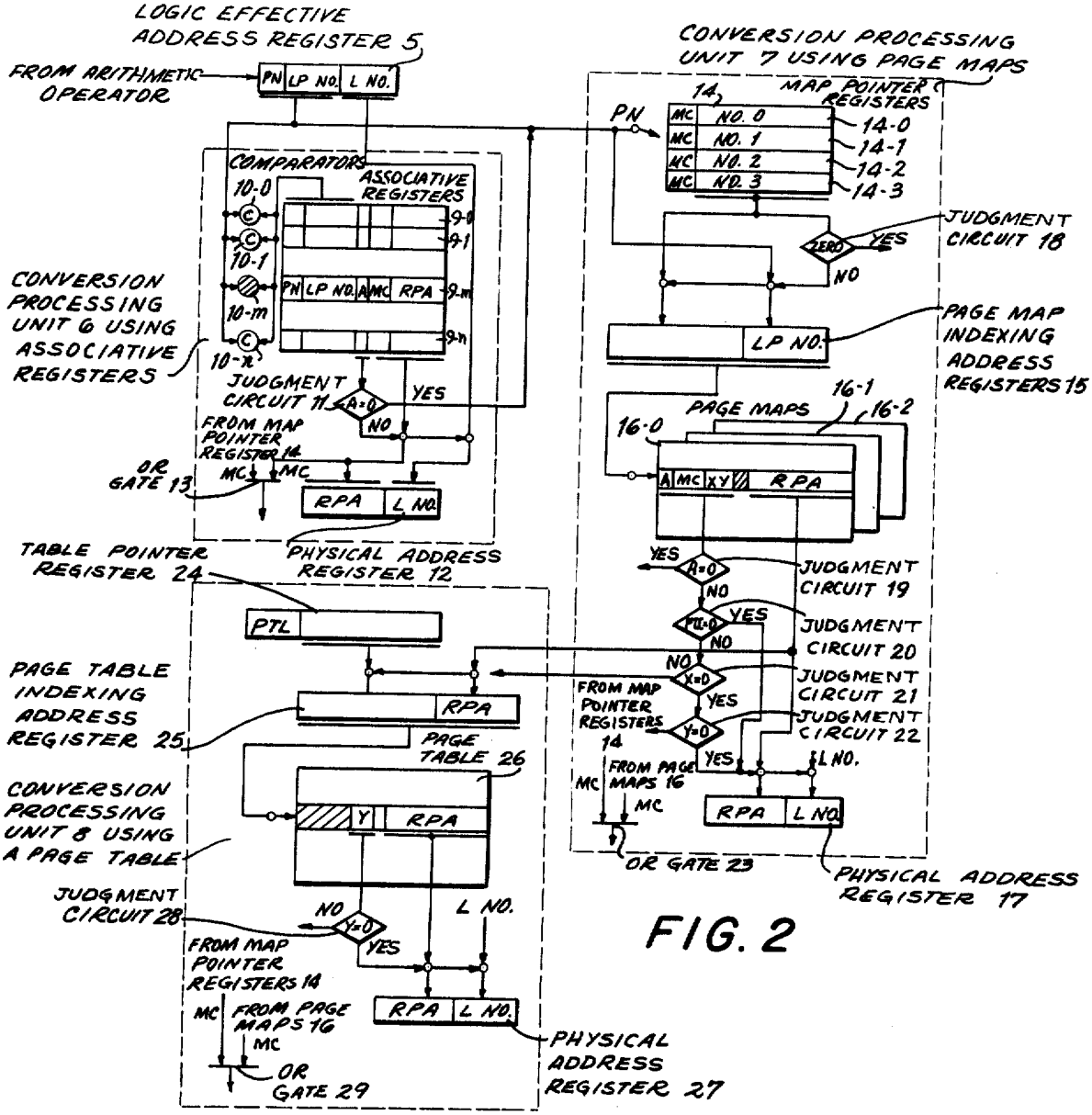
FIG. 2 is a block diagram of an embodiment of the data processing system of the invention.

In the data processing system of the invention, in order to solve the aforedescribed problems, the page table, as hereinafter described with reference to FIG. 2, is further provided. The page table is newly indexed when the physical address of the page 2—2 is indexed by means of the page map at the time of processing for the A program and when the physical address of the page 3—2 is indexed by means of the page map at the time of processing for the B program.

FIG. 2 shows an embodiment of the data processing system of the invention. In FIG. 2, logical addresses are supplied to a logical effective address register 5 from an arithmetic operator, not shown in the FIGS. The contents of the logical effective address register 5 are supplied to a conversion processing unit 6 using associative registers and to a conversion processing unit 7 using page maps of the invention. The conversion processing unit 7 is connected to a conversion processing unit 8 using a page table of the invention.

The conversion processing unit 6 using associative registers is not always necessary for the page address system. However, since the page map is usually stored in the main memory unit, if access is made to the main memory unit for every address conversion, there will be a considerable time loss, because access is required at least twice until the access is provided to the desired page. Thus, by previously storing the page map area of a page having a high probability of being accessed, into the associative register, provided at the central processing unit and operating at a high speed, there is a lesser probability of access to the main memory unit for address conversion.

The associative register is so named, because the register is not selected according to the address, as in the case of an ordinary memory unit, but is selected centering on an area in which the related contents are entered, according to part of the contents, as hereinafter described. This is because the information stored in the associative register varies in a wide range, irrespective of the register number. Therefore, it is uncertain if the content is that desired, or even if the register is that designated.

Each part of the data processing system of the invention is now explained, in detail, in configuration and operation.

The conversion processing unit 6 using associative registers includes associative registers 9-0, 9-1, . . . , 9-m, 9-n, having a read in coupled to a readout of the logical effective address register 5 via a plurality of comparators 10-0, 10-1, . . . , 10-m, 10-n. A judgment circuit 11 has an input connected to a readout of the associative register 9-n, an output connected to the conversion processing unit 7 and an output connected to a pair of read ins of a physical address register 12, which sets the physical address converted, and to an input of an OR gate 13. Another readout of the address register 5 is connected to one of the read ins of the physical address register 12. Information MC from map pointer registers 14-0 to 14-3 of the conversion processing unit 7 is supplied to the other input of the OR gate 13.

The conversion processing unit 7 using a page map comprises a map pointer register 14 having map pointer registers 14-0, 14-1, 14-2 and 14-3 having an input connected to a readout of the logical effective address register 5 and an output of the judgment circuit 11 of the conversion processing unit 6. The readout of the map pointer registers 14-0 to 14-3 is connected directly to an input of a page map indexing address register 15 and through a judgment circuit 18 to another input of the page map indexing address register. The readout of the logical effective address register 5 is also connected directly to both inputs of the page map indexing address register 15.

The readout of the page map indexing address register 15 is connected to the input of page maps 16-0, 16-1, 16-2, . . . A readout of the page maps 16-0, 16-1, 16-2, . . . is connected directly to a pair of inputs of a physical address register 17 and directly to a pair of inputs of a page table indexing address register 25 of the conversion processing unit 8. Another readout of the page maps 16-0, 16-1, 16-2, . . . is connected to the inputs of the physical address register 17 via a plurality of judgment circuits 19, 20, 21 and 22, connected in series. The output of the judgment circuit 20 is also connected to the inputs of the physical address register 17. The converted physical addresses are set in the physical address register 17. An OR gate 23 has a first input connected to the map pointer registers 14-0 to 14-3 and a second input connected to the page maps 16-0, 16-1, 16-2, . . .

The conversion processing unit 8 using a page table comprises a table pointer register 24 having a readout connected to an input of the page table indexing address register 25. The readout of the page table indexing address register 25 is connected to the input of a page table 26. The page table 26 has a readout directly connected to a pair of inputs of a physical address register 27 and another readout connected to said pair of inputs via a judgment circuit 28. The converted physical addresses are set in the physical address register 27. An OR gate 29 has a first input connected to the map pointer registers 14-0 to 14-3 and a second input connected to the page maps 16.

The physical addresses or page addresses of the main memory unit corresponding to a page having a great probability of use are stored in the associative registers 9-0 to 9-i n. The logical addresses provided for providing access to the main memory unit 1 from the arithmetic operator unit is composed of pointer information PN, the function of which is hereinafter described, "page No.", or LP No., and "line No.", or L No., as shown in the logical effective address register 5. The "page No." is the logical page address which is provided for the page for specifying it. The "line No." corresponds to the addresses within the page.

When the logical address is set in the logical effective address register 5, as hereinbefore mentioned, the "PN" and "page No." are compared with the "PN" and "page No." stored in the associative registers 9-0 to 9-n by the comparator circuits 10-0 to 10-n, respectively. If it is supposed that the "PN" and "page No." coincide with the "PN" and "page No." stored in the register 9-m, the comparator circuit 10-m produces a coincidence output, and therefore data or information "A", "MC" and "page address" in the register 9-m are read out. Here, data "A" expresses the effectiveness of the read out "page address", "MC" expresses data for protecting access, and the "page address" expresses the physical address corresponding to a given "PN" and "page No.".

The page address in the associative registers becomes invalid when the contents of the map pointer registers hereinafter described are changed or when a page map is rewritten. When the contents of a map pointer register are changed, so that a new page map is used, it cannot generally be used simultaneously with the previous one. Thus, the contents of an associative register stored on the basis of the previous page map shall be made invalid. This is because, if there is the same logical address in the different page maps, the pages are usually used for different programs.

If the validity is effective, that is, if A is not zero, the "page address" read out from the associative register 9-m is set at the upper digits of the physical address register 12. On the other hand, the "line No." of the given logical address, that is, the "address within the page" is set at the lower digits of the physical address register 12. Access is thereby provided to the main memory unit 1.

When it is impossible to obtain the physical address by conversion processing using the aforedescribed associative registers 9-0 to 9-n; in other words, when there is no desired "PN" and "page No." in an associative register or the data "A" is zero, the conversion processing unit 7 using page maps is utilized.

In the conversion processing unit 7, a plurality of page maps, such as, for example, three page maps 16-0, 16-1, 16-2, . . . are provided in the main memory unit 1. When access is provided to the particular addresses of each page map, the "page address", or physical address, is read out and set in the upper digits of the physical address register 17. Furthermore, the map pointer registers 14-0, 14-1, 14-2 and 14-3 of the conversion processing unit 7 are accessed by the pointer data PN in a provided logical address.

Thus, the relevant contents, such as, for example, No. 1 pointer, are read out. The No. 1 pointer is set at the upper digits of the page map indexing address register 15. On the other hand, the "page No." in the provided logical address is set at the lower digits of the page map indexing address register 15. The map pointer registers show the storage position in the main memory unit of the page map. The contents, or No. 0 to No. 3 pointers, are respectively utilized as the heading physical address of the page map.

If only four map pointer registers 14-0 to 14-3 are provided, only four page maps 16-0, and so on, may be used. The desired page map may be utilized, however, by rewriting the contents of the map pointer registers. It is also possible to rewrite the page map partially or entirely. The page map is selected in accordance with the upper digits of the page map indexing address register 15, and then the map area of the page map is selected in accordance with the lower digits. The physical address of the desired page and the data "A", "MC" and "XY" for control, are thereafter read out from the map area of the page map. The data "A" and "MC" are similar to those of the aforedescribed associative register and "A" indicates validity of the page map. Data "X" indicates whether or not there shall be conversion processing using the page table of the invention. Data "Y" indicates whether or not the relevant page exists in the main memory unit.

In general, the "page address" previously read out is set at the upper digits of the physical address register 17 via the judgement circuits 19, 20, 21 and 22. The "line No.", that is, the "address in page", of the provided logical address is set at the lower digits of the physical address register 17. The main memory unit is thereby accessed.

When the judgment circuit 19 provides an answer or output YES, and the judgment circuit 22 provides an answer or output NO, the exceptional operation other than the page assignment operation is performed. Thus, for example, processing by the control means (not shown in the FIGS.) such as the transfer of data to the main memory unit from the auxiliary memory, is carried out. The judgment circuit 20 provides an output YES when the conversion processing unit 8 using a page table of the invention, as hereinafter described, is not provided.

Address conversion in the existing data processing system is hereinbefore explained. The second address conversion of the invention is hereinafter explained.

As hereinbefore explained with reference to FIG. 1, when the physical address of the page 2—2 or the page 3—2 is changed to the page 4—0, the map areas corresponding to the relevant pages 2—2 and 3—2 have to be rewritten. In such a case, the page table 26 is provided in order to complete the rewriting of an area only once, and only the specified area of said page table is used in common for the pages 2—2 and 3—2, as hereinbefore explained. The rewriting of only an area of the page table is thereby provided, when changing the physical address.

The data processing system of FIG. 2 is hereinafter explained in greater detail. The data "X" in the appropriate area of each page map 16—0, 16—1, 16—2, ..., is set as "1" for pages used in common and is set as "0" for pages not used in common. These settings are previously provided by use of a management program, or the like. Thus, the address conversion for the pages where "X" is zero is carried out by the page maps, as hereinbefore explained. The address conversion for the pages where "X" is 1 is performed by further indexing, or accessing, an area on the page table 26 by using the physical address obtained in the conversion using the page map, in order to obtain the true physical address being stored therein.

Since the same physical addresses are stored in each area of the page map concerning the pages used in common, the same address may be obtained from the page map, even if the page 2—2 is accessed by the A program, or if the page 3—2 is accessed by the B program. Therefore, by accessing the same area of the page table 26 by using this address, only the desired physical address can be gained. If the same area of the page table 26 is accessed, only the rewriting of the physical address on the page table is required, and there is no need to change the page map, even when changing the physical addresses.

Since the page table 26 is usually stored in the main memory unit 1, the table pointer register 24 is prepared for indicating the physical address in the main memory unit of said page table. When "X = 1" is found as a result of indexing a page map 16-0, 16-1, 16-2, ..., the page address obtained from the page map is set at the lower digits of the page table indexing address register 25, and the table address from the table pointer register 24 is set at the upper digits. The page table 26 is then indexed and the obtained contents or true physical address, are set at the upper digits of the physical address register 27, while the "line No." provided in the logical effective address register 5 is set at the lower digits. The desired page is thereby accessed.

The data "Y" in the page table 26 is similar to that in the page map 16-0, 16-1, 16-2, ... The data "PTL" in the upper digits of the table pointer register 24 indicates the size, or length, of the page table 26. When the page table 26 is not provided, or is not required to be used for some reason, processing may be accomplished without judging the data "X" by using the judgment circuit 20 of the conversion processing unit 7 utilizing page maps and by making the data "PTL" "0".

As hereinbefore described, by making the data "X" of the area in the corresponding page map 16-0, 16-1, 16-2, ..., "1" for the pages to be used in common for various applications, the page table 26 is further indexed by issuing the data read out from said page map. In addition, only the rewriting of the contents of the page table 26 is required for changing the physical address. Alteration of the physical address may therefore be accomplished with ease and facility.

There is no need to provide the physical address registers 12, 17 and 27, the page map indexing address register 15, or the page table indexing address register 25 for their aforedescribed respective purposes, and it is possible to use only a single address register for all these purposes.

Figure 3:
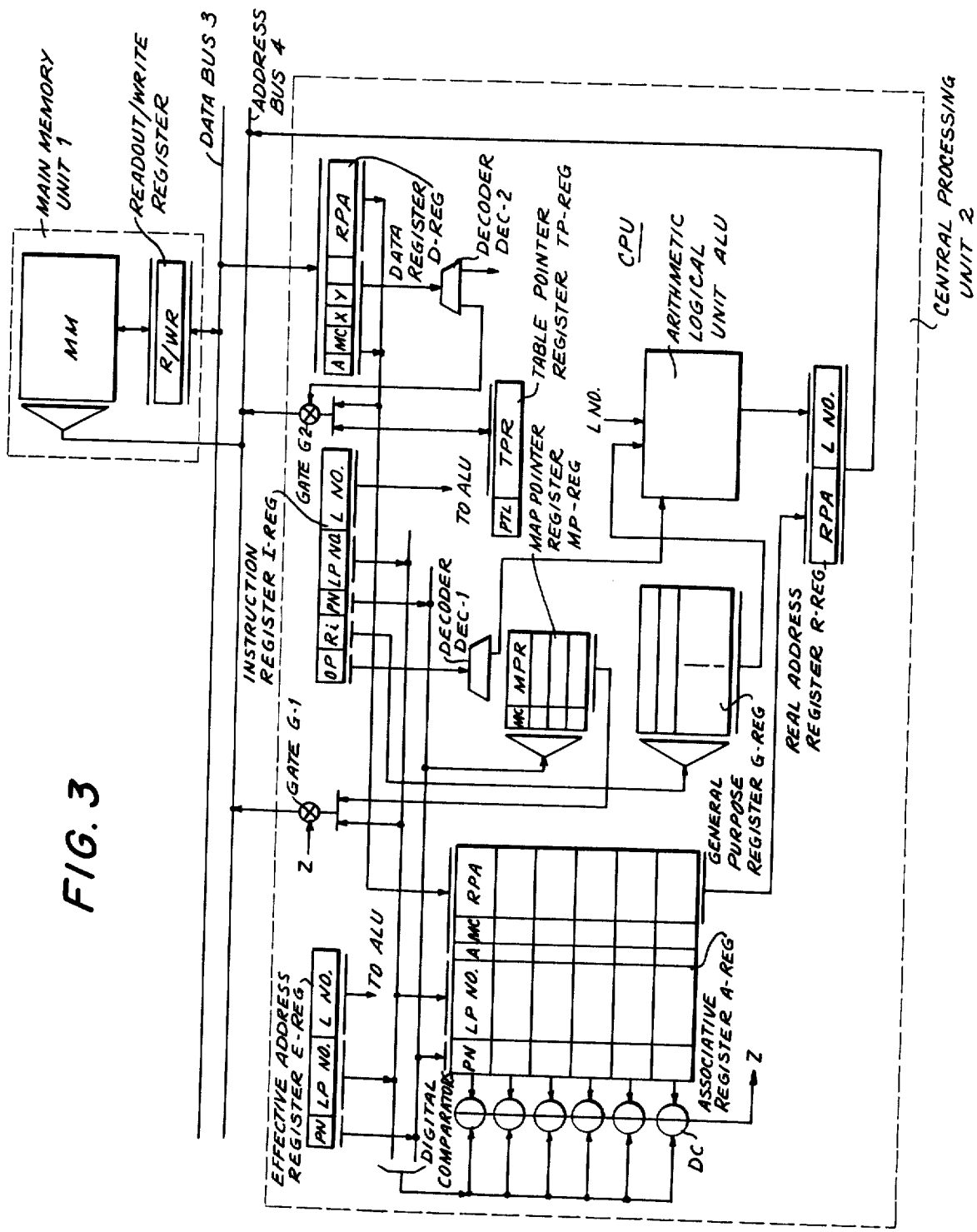
FIG. 3 is a block diagram of an embodiment of the main memory unit and the central processing unit of the date processing system of the invention.

FIG. 3 shows an embodiment of the main memory unit and the central processing unit of the data processing system of the invention. The main memory unit 1 of FIG. 3 has a readout/write register R/WR. The central processing unit, or CPU, 2, and the main memory unit 1 are connected to a data bus 3 and an address bus 4. The main memory MM of the main memory unit 1 is directly connected to the address bus 4 and is coupled to the data bus 3 via the readout/write register R/WR.

The central processing unit 2 comprises an effective address register E-Reg having a first readout connected in common to a first input of each of a plurality of digital comparators DC, to a first read in of an associative register A-Reg and to the read in of a map pointer register MP-Reg. The associative register A-Reg has a plurality of outputs, each connected to a second input of a corresponding one of the digital comparators DC. The digital comparators DC produce an output signal Z.

The effective address register E-Reg has a second readout connected in common to the first inputs of the digital comparators DC, to a second read in of the associative register A-Reg and to a first input of a gate G1. The effective address register E-Reg has a third readout connected to a first input of an arithmetic logical unit ALU. The map pointer register MP-Reg has a readout connected to a second input of the gate G1. The associative register A-Reg has a readout connected to a first read in of a real address register R-Reg.

An instruction register I-Reg has a first readout connected to the input of a decoder DEC1. The output of the decoder DEC1 is connected to a second input of the arithmetic logical unit ALU. The instruction register I-Reg has a second readout connected to the read in of a general purpose register G-Reg. The general purpose register G-Reg has a readout connected to a third input of the arithmetic logical unit ALU. The instruction register I-Reg has a third readout connected in common to the first inputs of the digital comparators DC, to the first read in of the associative register A-Reg and to the read in of the map pointer register MP-Reg.

The instruction register I-Reg has a fourth readout connected in common to the first inputs of the digital comparators DC, to the second read in of the associative register A-Reg and to the first input of the gate G1. The instruction register I-Reg has a fifth readout connected to the first input of the arithmetic logical unit ALU. The arithmetic logical unit ALU has an output connected to a second read in of the real address register R-Reg. The real address register R-Reg has a readout connected to the address bus 4.

A table pointer register TP-Reg has a readout connected to a first input of a gate G2. A data register D-Reg has a read in connected to the data bus 3 and a first readout connected to a third read in of the associative register A-Reg, to a second input of the gate G2 and to the input of a decoder DEC2. The data register D-Reg has a second readout connected to the third read in of the associative register A-Reg, to the second input of the gate G2 and to the input of the decoder DEC2. The decoder DEC2 has an output connected to a control input of the gate G2.

Each of the gates G1 and G2 has an output connected to the address bus 4.

The effective address register E-Reg corresponds to the logical effective address register 5 of FIG. 2, and the logical effective address is set therein. The contents of the effective address register E-Reg are classified as pointer information "PN", logical page No. "LP No." and line No. "L No.". The PN and LP Nos. are compared with the contents of the associative register A-Reg at a time in the digital comparators DC. If they coincide even in part, the real page address part, or "RPA", is read out and set at the upper digits of the real address register R-Reg, and the L No. of the effective address register E-Reg is set directly at the lower digits of said real address register via the arithmetic logical unit ALU or with appropriate modification.

If the PN and LP Nos. do not coincide with the contents of the associative register A-Reg, the gate G1 opens and the map address in the map pointer register MP-Reg selected by the PN of the effective address register E-Reg and the LP No. of said effective address register are fed as output to the data bus 4. The result is read out from the main memory unit 1 and the entry on the page map is read to the data register D-Reg. The X and Y bits are decoded at the decoder DEC2. If X = 0, the real page address part RPA, and the data A and MC of the data register D-Reg are read into the associative register A-Reg. At the same time, the PN and LP No. of the effective address register E-Reg are also written in said associative register. If X = 1, the gate G2 opens, and the table address of the table pointer register TP-Reg and the real page address part RPA of the data register D-Reg are fed to the address bus 4. As a result, the entry on the page table is read out to the data register D-Reg. Therefore, the bit Y is decoded by the decoder DEC2.

If Y = 0, the real page address part RPA, and the data A and MC are written in the associative register A-Reg. At the same time, the PN and LP No. of the effective address register E-Reg are also written in said associative register. When the real page address RPA is obtained by using the page map or page table, it may be set in the real address register R-Reg after writing it into the associative register A-Reg and again reading it from said associative register, or it may be set in said real address register in parallel with the writing into the associative register A-Reg.

Instructions, including an operating code OP, a register indicating code Ri and logical address, are set in the instruction register I-Reg. The register indicating code Ri selects one of the registers of the general purpose register G-Reg. The operating code OP is decoded by the decoder DEC1 and is used for the control of the arithmetic logical unit ALU and other components.

The logical address always exists in the instructions set in the instruction register I-Reg. The effective address register E-Reg is not always necessary, so that it is possible to use in common the logical address part of the instruction register I-Reg.

While the invention has been described by means of a specific example and in a specific embodiment, we do not wish to be limited thereto, for obvious modifications will occur to those skilled in the art without departing from the spirit and scope of the invention.

We claim:

1. A data processing system for converting from logical addresses to physical addresses, said data processing system having address converting means for converting logical addresses of a program to physical addresses of a memory device, said memory device having a plurality of memory areas, said address converting means being commonly utilizable for a plurality of applications with desired corresponding logical addresses and capable of providing access to the memory device in accordance with physical addresses obtained by said address converting means, said address converting means comprising first address converting means having entries corresponding to the logical addresses of the program on a 1:1 basis, said first address converting means storing physical addresses corresponding to said logical addresses, each entry of the first address converting means having data indicating whether or not the memory area of the memory device corresponding to physical addresses stored in said entry is commonly used for applications, and second address converting means having unique entries each commonly selected by any one of the logical addresses corresponding to each memory area of the memory device commonly used, said second address converting means storing physical addresses corresponding to the memory areas of said memory device commonly used, an entry of the second address converting means being indexed by a physical address stored in an entry of the first address converting means, which entry of the first address converting means includes data indicating that the corresponding memory area is commonly used.

2. A data processing system as claimed in claim 1, wherein each entry of the first and second address converting means is stored in the memory device, and further comprising an associative register in addition to the first and second address converting means, said associative register comprising a plurality of registers each storing the logical addresses and the corresponding physical addresses whereby when the associative register fails to provide a desired physical address reference is initially made to the first address converting means and when said first address converting means has an entry having data indicating whether or not the memory area of the memory device corresponding to physical addresses stored in said entry is commonly used for applications, reference is initially made to the second address converting means and comparator means connected to the registers of the associative register for comparing the logical address of the program with the logical address stored in each of said registers, the physical address of the corresponding one of said registers being used as the real address when said comparator means indicates coincidence of the logical address of said one of said registers and the logical address of the program, and address conversion being undertaken by the first address converting means when said comparator means indicates noncoincidence of the logical address of said one of said registers and the logical address of the program.

* * * * *